US00RE40257E

(19) United States
(12) Reissued Patent
Doepker et al.

(10) Patent Number: US RE40,257 E
(45) Date of Reissued Patent: Apr. 22, 2008

(54) COMPRESSOR PULSE WIDTH MODULATION

(75) Inventors: Roy J. Doepker, Lima, OH (US); Mark Bass, Wilder, KY (US); James F. Fogt, Sidney, OH (US); Jeffrey A. Huddleston, Sidney, OH (US)

(73) Assignee: Emerson Climate Technologies, Inc., Sidney, OH (US)

(21) Appl. No.: 10/675,907

(22) Filed: Sep. 29, 2003

Related U.S. Patent Documents

Reissue of:
(64) Patent No.: 6,213,731
Issued: Apr. 10, 2001
Appl. No.: 09/401,343
Filed: Sep. 21, 1999

(51) Int. Cl.
*F04B 49/02* (2006.01)
*F25B 49/02* (2006.01)

(52) U.S. Cl. ..... 417/310; 417/440; 417/299; 62/228.5

(58) Field of Classification Search ..... 417/44.1, 417/212, 214, 220, 299, 310, 440; 62/228.5, 62/228.3, 196.3; 418/55.5, 57
See application file for complete search history.

(56) References Cited

U.S. PATENT DOCUMENTS 4,332,144 A * 6/1982 Shaw ..... 62/324.1
4,475,360 A 10/1984 Kensauka et al.
4,745,777 A * 5/1988 Morishita et al. ..... 62/509
4,747,756 A * 5/1988 Sato et al. ..... 417/307
4,877,382 A 10/1989 Weatherston
4,982,572 A * 1/1991 Moore ..... 62/122
5,059,098 A * 10/1991 Suzuki et al. ..... 417/295
5,329,788 A * 7/1994 Caillat et al. ..... 62/505
5,342,186 A * 8/1994 Swain ..... 418/55.5
5,447,420 A * 9/1995 Caillat et al. ..... 418/55.5
5,611,674 A * 3/1997 Bass et al. ..... 417/220
5,613,841 A * 3/1997 Bass et al. ..... 417/310
5,741,120 A * 4/1998 Bass et al. ..... 417/44.2
6,047,557 A * 4/2000 Pham et al. ..... 62/228.5
6,120,255 A * 9/2000 Schumann et al. ..... 417/213
6,123,517 A * 9/2000 Brooke et al. ..... 417/299

FOREIGN PATENT DOCUMENTS

EP 0 423 976 4/1991
EP 0 423 976 A1 4/1991
EP 0 747 597 A2 12/1996
EP 0 747 597 A 12/1996
JP 59-117895 * 8/1984
WO WO 99/17066 4/1999
WO WO 99 17066 A 4/1999

OTHER PUBLICATIONS

European Search Report for Application No. EP 00 30 8176; May 3, 2002; 4 Pages.

* cited by examiner

*Primary Examiner*—Charles G. Freay
(74) *Attorney, Agent, or Firm*—Harness, Dickey & Pierce, P.L.C.

(57) ABSTRACT

A scroll compressor includes a capacity modulation system. The capacity modulation system has a piston that is connected to the non-orbiting scroll that disengages the non-orbiting scroll from the orbiting scroll when a pressure chamber is placed in communication with the suction chamber of the compressor. The non-orbiting scroll member moves into engagement with the orbiting scroll when the chamber is placed in communication with the discharge chamber. The engagement between the two scrolls is broken when the pressure chamber is placed in communication with fluid from the suction chamber. A solenoid valve controls the communication between the pressure chamber and the suction chamber. By operating the valve in a pulsed width modulated mode, the capacity of the compressor can be infinitely varied between zero and one hundred percent.

55 Claims, 8 Drawing Sheets

94
106
297
270
277
268
266
210
108
282
257
250
242
258
240
280
224
104
237
256
260
248
310
254
238
98
226
220
228
230
246
216
214
212
218
244
222

COMPRESSOR PULSE WIDTH MODULATION

Matter enclosed in heavy brackets [ ] appears in the original patent but forms no part of this reissue specification; matter printed in italics indicates the additions made by reissue.

FIELD OF THE INVENTION

The present invention is related to scroll-type machinery. More particularly, the present invention is directed towards capacity modulation of scroll-type compressors.

BACKGROUND AND SUMMARY OF THE INVENTION

Scroll machines are becoming more and more popular for use as compressors in refrigeration systems as well as air conditioning and heat pump applications. The popularity of scroll machinery is primarily due to their capability for extremely efficient operation. Generally, these machines incorporate a pair of intermeshed spiral wraps, one of which is caused to orbit with respect to the other so as to define one or more moving chambers which progressively decrease in size as they travel from an outer suction port towards a center discharge port. An electric motor is normally provided which operates to drive the scroll members via a suitable drive shaft. During normal operation, these scroll machines are designed to have a fixed compression ratio.

Air conditioning and refrigeration systems experience a wide range of loading requirements. Using a fixed compression ratio compressor to meet this wide range of loading requirements can present various problems to the designer of the system. One method of adapting the fixed compression ratio compressors to the wide range of loading requirements is to incorporate a capacity modulation system into the compressor. Capacity modulation has proven to be a desirable feature to incorporate into the air conditioning and refrigeration compressors in order to better accommodate the wide range of loading to which the systems may be subjected. Many different approaches have been utilized for providing this capacity modulation feature. These prior art systems have ranged from control of the suction inlet to bypassing compressed discharge gas directly back into the suction area of the compressor. With scroll-type compressors, capacity modulation has often been accomplished via a delayed suction approach which comprises providing ports at various positions along the route of the compression chambers which, when opened, allow the compression chambers formed between the intermeshing scroll wraps to communicate with the suction gas supply, thus delaying the point at which compression of the suction gas begins. This delayed suction method of capacity modulation actually reduces the compression ratio of the compressor. While such systems are effective at reducing the capacity of the compressor, they are only capable of providing a predetermined or stepped amount of compressor unloading. The amount of unloading or the size of the step is dependent upon the positioning of the unloading ports along the wraps or the compression process. While it is possible to provide multiple stepped unloading by incorporating a plurality of unloading ports at different locations along the compression process, this approach becomes more and more costly as the number of ports is increased and it requires additional space to accommodate the separate controls for opening and closing each individual on each set of ports.

The present invention, however, overcomes these deficiencies by enabling an infinitely variable capacity modulation system which has the capability of modulating the capacity from 100% of full capacity down to virtually zero capacity utilizing only a single set of controls. Further, the system of the present invention enables the operating efficiency of the compressor and/or refrigeration system to be maximized for any degree of compressor unloading desired.

In the present invention, compressor unloading is accomplished by cyclically effecting axial separation of the two scroll members during the operating cycle of the compressor. More specifically, the present invention provides an arrangement wherein one scroll member is moved axially with respect to the other scroll member by a solenoid valve which operates in a pulsed width modulation mode. The pulsed width modulation operating mode for the solenoid valve provides a leakage path across the tips of the wraps from the higher compression pockets defined by the intermeshing scroll wraps to the lower compression pockets and ultimately back to suction. By controlling the pulse width modulation frequency and thus the relative time between sealing and unsealing of the scroll wrap tips, infinite degrees of compressor unloading can be achieved with a single control system. Further, by sensing various conditions within the refrigeration system, the duration of compressor loading and unloading for each cycle can be selected for a given capacity such that overall system efficiency is maximized.

The various embodiments of the present invention detailed below provide a wide variety of arrangements by which one scroll member may be axially reciprocated with respect to the other to accommodate a full range of compressor unloading. The ability to provide a full range of capacity modulation with a single control system as well as the ability to select the duration of loaded and unloaded operation cooperate to provide an extremely efficient system at a relatively low cost.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
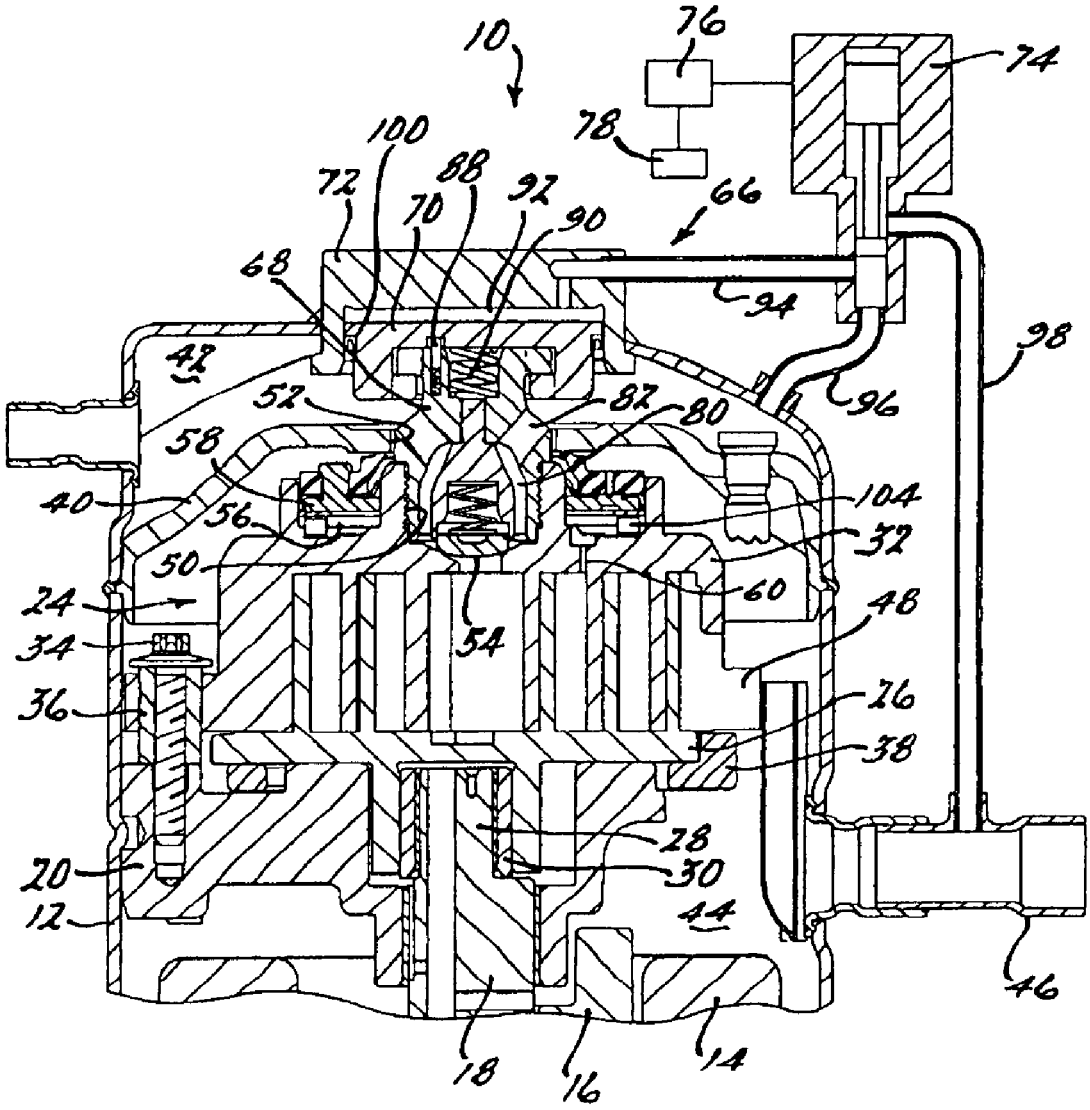
FIG. 1 is a section view of a scroll-type refrigeration compressor in accordance with the present invention operating at full capacity.

Referring now to the drawings in which like reference numerals designate like or corresponding parts throughout the several views, there is shown in FIG. 1 a scroll compressor which includes the unique capacity control system in accordance with the present invention and which is designated generally by the reference numeral 10. Scroll compressor 10 is generally of the type described in Assignee's U.S. Pat. No. 5,102,316, the disclosure of which is incorporated herein by reference. Scroll compressor 10 comprises an outer shell 12 within which is disposed a driving motor including a stator 14 and a rotor 16, a crankshaft 18 to which rotor 16 is secured, an upper bearing housing 20 and a lower bearing housing (not shown) for rotatably supporting crankshaft 18 and a compressor assembly 24.

Compressor assembly 24 includes an orbiting scroll member 26 supported on upper bearing housing 20 and drivingly connected to crankshaft 18 via a crankpin 28 and a drive bushing 30. A non-orbiting scroll member 32 is positioned in meshing engagement with orbiting scroll member 26 and is axially movably secured to upper bearing housing 20 by means of a plurality of bolts 34 and associated sleeve members 36. An Oldham coupling 38 is provided which cooperates with scroll members 26 and 32 to prevent relative rotation therebetween. A partition plate 40 is provided adjacent the upper end of shell 12 and serves to divide the interior of shell 12 into a discharge chamber 42 at the upper end thereof and a suction chamber 44 at the lower end thereof.

In operation, as orbiting scroll member 26 orbits with respect to non-orbiting scroll member 32, suction gas is drawn into suction chamber 44 of shell 12 via a suction fitting 46. From suction chamber 44, suction gas is sucked into compressor 24 through an inlet 48 provided in non-orbiting scroll member 32. The intermeshing scroll wraps provided on scroll members 26 and 32 define moving pockets of gas which progressively decrease in size as they move radially inwardly as a result of the orbiting motion of scroll member 26 thus compressing the suction gas entering via inlet 48. The compressed gas is then discharged into discharge chamber 42 through a hub 50 provided in scroll member 32 and a passage 52 formed in partition 40. A pressure responsive discharge valve 54 is preferably provided seated within hub 50.

Non-orbiting scroll member 32 is also provided with an annular recess 56 formed in the upper surface thereof. A floating seal 58 is disposed within recess 56 and is biased by intermediate pressurized gas against partition 40 to seal suction chamber 44 from discharge chamber 42. A passage 60 extends through non-orbiting scroll member 32 to supply the intermediate pressurized gas to recess 56.

A capacity control system 66 is shown in association with compressor 10. Control system 66 includes a discharge fitting 68, a piston 70, a shell fitting 72, a three-way solenoid valve 74, a control module 76 and a sensor array 78 having one or more appropriate sensors. Discharge fitting 68 is threadingly received or otherwise secured within hub 50. Discharge fitting 68 defines an internal cavity 80 and a plurality of discharge passages 82. Discharge valve 54 is disposed within cavity 80. Thus, pressurized gas overcomes the biasing load of discharge valve 54 to open discharge valve 54 and allowing the pressurized gas to flow into cavity 80, through passages 82 and into discharge chamber 42.

Figure 3:
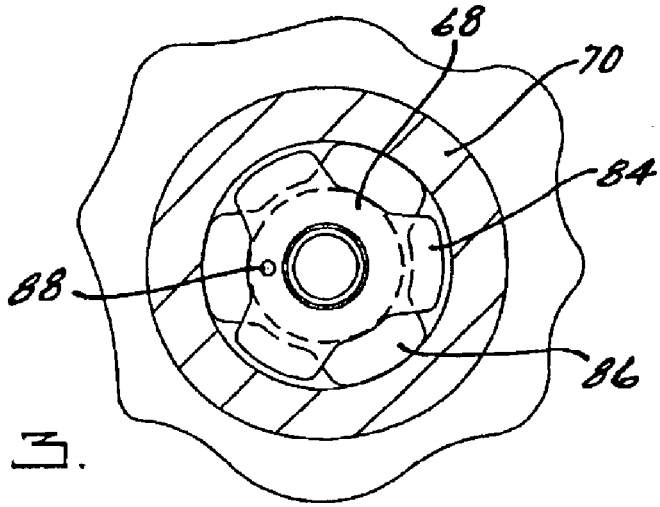
FIG. 3 is a detailed view of the ring and biasing arrangement taken in the direction of arrows 3—3 shown in FIG. 2.

Referring now to FIGS. 1 and 3, discharge fitting 68 is assembled to piston 70 by first aligning a plurality of tabs 84 on discharge fitting 68 with a matching plurality of slots 86 formed in piston 70. Discharge fitting 68 is then rotated to the position shown in FIG. 3 to misalign tabs 84 with slots 86. An alignment pin 88 maintains the misalignment between tabs 84 and slots 86 while a coil spring 90 biases the two components together.

Shell fitting 72 is sealingly secured to shell 12 and slidingly receives piston 70. Piston 70 and shell fitting 72 define a pressure chamber 92. Pressure chamber 92 is fluidically connected to solenoid 74 by a tube 94. Solenoid valve 74 is also in fluid communication with discharge chamber 42 through a tube 96 and it is in fluid communication with suction fitting 46 and thus suction chamber 44 through a tube 98. A seal 100 is located between piston 70 and shell fitting 72. The combination of piston 70, seal 100 and shell fitting 72 provides a self-centering sealing system to provide accurate alignment between piston 70 and shell fitting 72.

In order to bias non-orbiting scroll member 32 into sealing engagement with orbiting scroll member 26 for normal full load operation as shown in FIG. 1, solenoid valve 74 is deactivated (or it is actuated) by control module 76 to the position shown in FIG. 1. In this position, discharge chamber 42 is in direct communication with chamber 92 through tube 96, solenoid valve 74 and tube 94. The pressurized fluid at discharge pressure within chambers 42 and 92 will act against opposite sides of piston 70 thus allowing for the normal biasing of non-orbiting scroll member 32 towards orbiting scroll member 26 as shown in FIG. 1 to sealingly engage the axial ends of each scroll member with the respective end plate of the opposite scroll member. The axial sealing of the two scroll members 26 and 32 causes compressor 24 to operate at 100% capacity.

Figure 2:
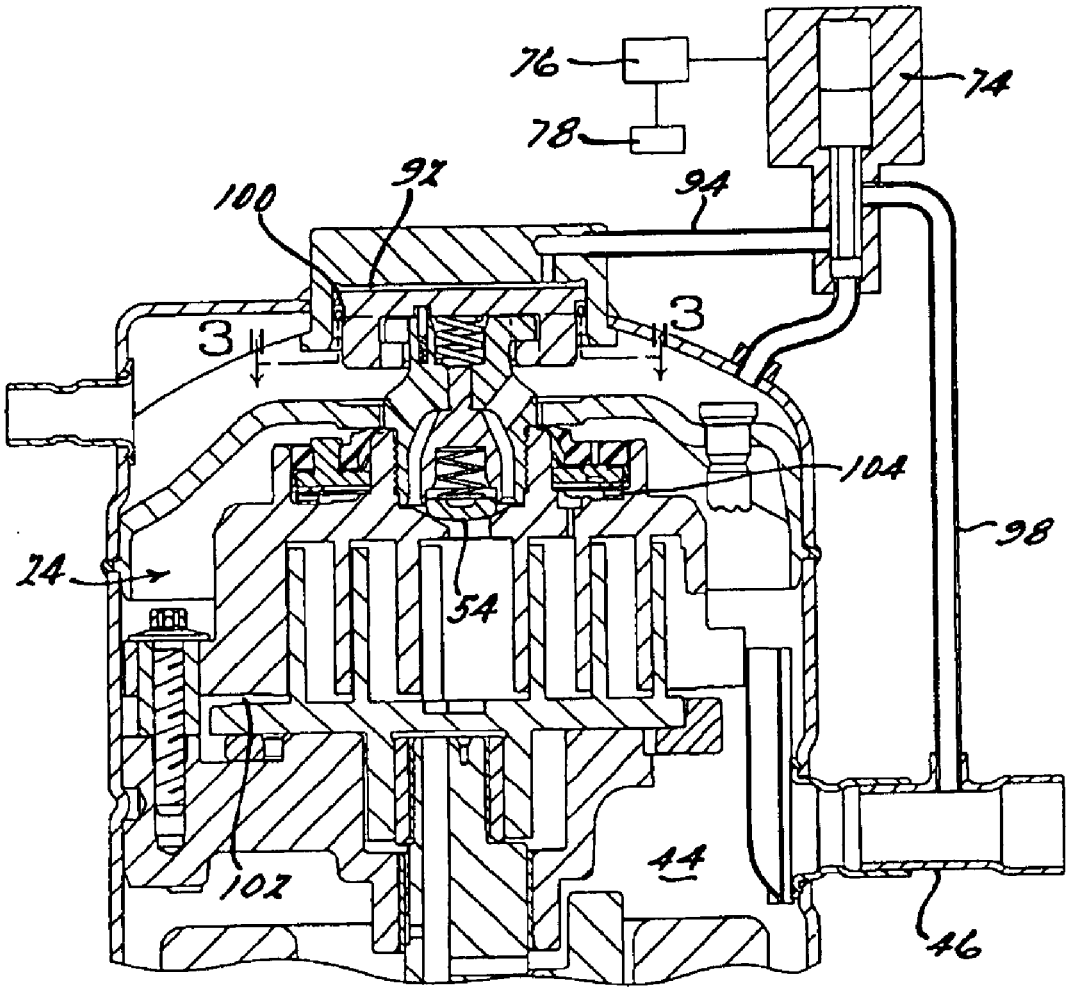
FIG. 2 is a section view of the scroll-type refrigeration compressor shown in FIG. 1 operating at a reduced capacity.
Figure 9:
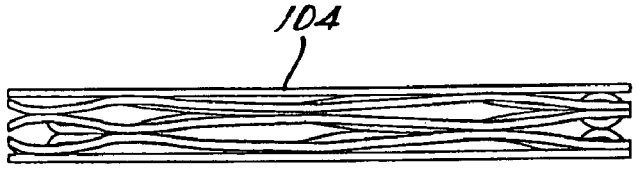
FIG. 9 is an elevational view of the biasing spring shown in FIG. 5.

In order to unload compressor 24, solenoid valve 74 will be actuated (or it is deactuated) by control module 76 to the position shown in FIG. 2. In this position, suction chamber 44 is in direct communication with chamber 92 through suction fitting 46, tube 98, solenoid valve 74 and tube 94. With the discharge pressure pressurized fluid released to suction from chamber 92, the pressure differences on opposite sides of piston 70 will move non-orbiting scroll member 32 upward as shown in FIG. 2 to separate the axial ends of the tips of each scroll member with its respective end plate to create a gap 102 which allows the higher pressurized pockets to bleed to the lower pressurized pockets and eventually to suction chamber 44. A wave spring 104 which is illustrated in FIG. 9 maintains the sealing relationship between floating seal 58 and partition 40 during the modulation of non-orbiting scroll member 32. The creation of gap 102 will substantially eliminate continued compression of the suction gas. When this unloading occurs, discharge valve 54 will move to its closed position thereby preventing the backflow of high pressurized fluid from discharge chamber 42 or the downstream refrigeration system. When compression of the suction gas is to be resumed, solenoid valve 74 will be deactuated (or it will be actuated) to the position shown in FIG. 1 in which fluid communication between chamber 92 and discharge chamber 42 is again created. This again allows fluid at discharge pressure to react against piston 70 to axially engage scroll members 26 and 32. The axial sealing engagement recreates the compressing action of compressor 24.

Control module 76 is in communication with sensor array 78 to provide the required information for control module 76 to determine the degree of unloading required for the particular conditions of the refrigeration system including scroll compressor 10 existing at that time. Based upon this information, control module 76 will operate solenoid valve 74 in a pulsed width modulation mode to alternately place chamber 92 in communication with discharge chamber 42 and suction chamber 44. The frequency with which solenoid 74 is operated in the pulsed width modulation mode will determine the percent capacity of operation of compressor 24. As the sensed conditions change, control module 76 will vary the frequency of operation for solenoid valve 74 and thus the relative time periods at which compressor 24 is operated in a loaded and unloaded condition. The varying of the frequency of operation of solenoid valve 74 can cause the operation of compressor between fully loaded or 100% capacity and completely unloaded or 0% capacity or at any of an infinite number of settings in between in response to system demands.

Figure 4:
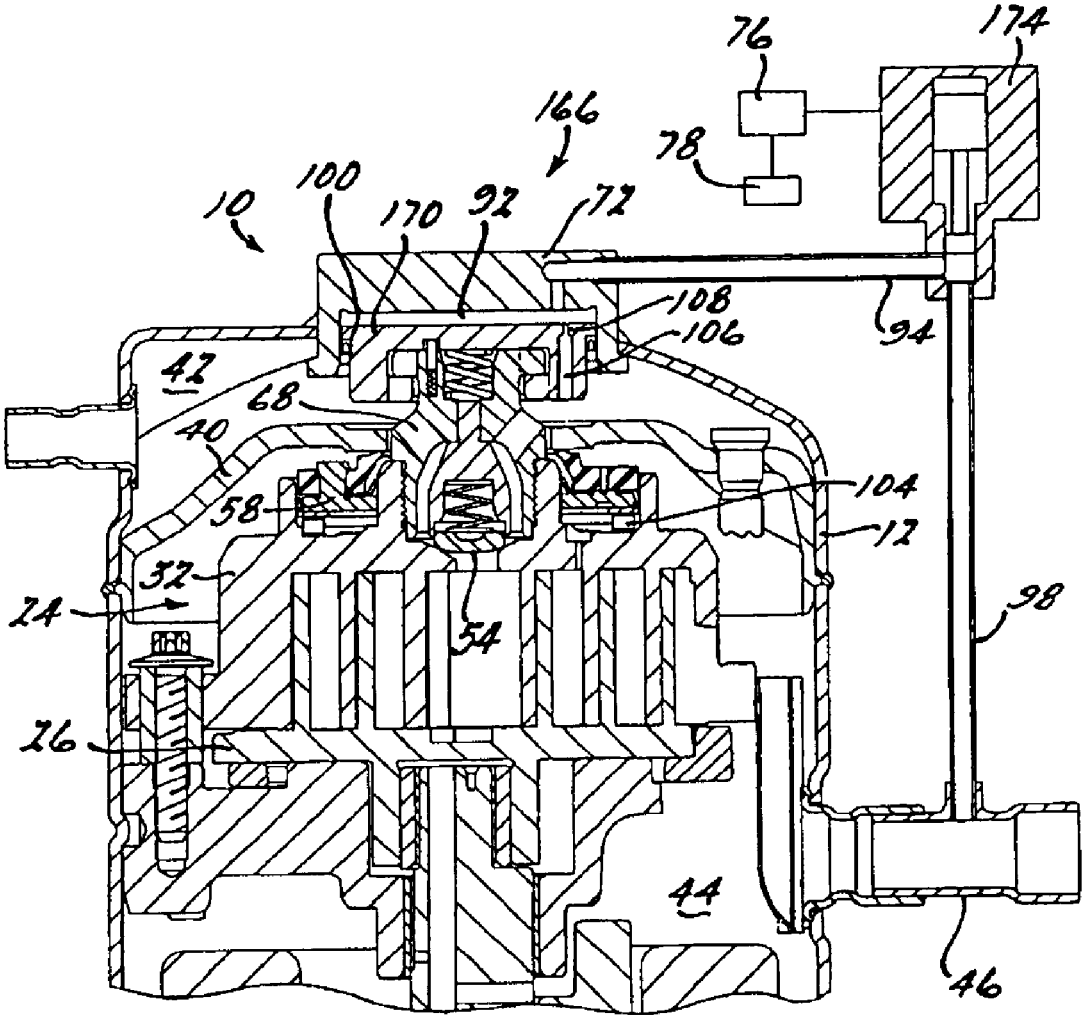
FIG. 4 is a section view of a scroll-type refrigeration compressor in accordance with another embodiment of the present invention operating at full capacity.

Referring now to FIG. 4, there is shown a unique capacity control system in accordance with another embodiment of the present invention which is designated generally as reference numeral 166. Capacity control system 166 is also shown in association with compressor 10. Capacity control system 166 is similar to capacity control system 66 but it uses a two-way solenoid valve 174 instead of three-way solenoid valve 74. Control system 166 includes discharge fitting 68, a piston 170, shell fitting 72, solenoid valve 174, control module 76 and sensor array 78.

Piston 170 is identical to piston 70 with the exception that piston 170 defines a passageway 106 and an orifice 108 which extend between pressure chamber 92 and discharge chamber 42. The incorporation of passageway 106 and orifice 108 allows the use of two-way solenoid 174 instead of three-way solenoid 74 and the elimination of tube 96. By eliminating tube 96, the fitting and hole through shell 12 is also eliminated. Seal 100 is located between piston 170 and seal fitting 72 to provide for the self-aligning sealing system for piston 170 and fitting 72.

Solenoid 174 operates in a manner similar to solenoid 74. Pressure chamber 92 is fluidically connected to solenoid 174 by tube 94. Solenoid valve 174 is also in fluid communication with suction fitting 46 and thus suction chamber 44 by tube 98.

In order to bias non-orbiting scroll member 32 into sealing engagement with orbiting scroll member 26 for normal full load operation, solenoid valve 174 is deactivated (or it is activated) by control module 76 to block fluid flow between tube 94 and tube 98. In this position, chamber 92 is in communication with discharge chamber 42 through passageway 106 and orifice 108. The pressurized fluid at discharge pressure within chambers 42 and 92 will act against opposite sides of piston 170 thus allowing for the normal biasing of non-orbiting scroll member 32 towards orbiting scroll member 26 to sealingly engage the axial ends of each scroll member with the respective end plate of the opposite scroll member. The axial sealing of the two scroll members 26 and 32 causes compressor 24 to operate at 100% capacity.

In order to unload compressor 24, solenoid valve 174 will be actuated (or it will be deactuated) by control module 76 to the position shown in FIG. 4. In this position, suction chamber 44 is in direct communication with chamber 92 through suction fitting 46, tube 98, solenoid valve 174 and tube 94. With the discharge pressure pressurized fluid released to suction from chamber 92, the pressure differences on opposite sides of piston 170 will move non-orbiting scroll member 32 upward to separate the axial end of the tips of each scroll member with its respective end plate and the higher pressurized pockets will bleed to the lower pressurized pockets and eventually to suction chamber 44. Orifice 108 is incorporated to control the flow of discharge gas between discharge chamber 42 and chamber 92. Thus, when chamber 92 is connected to the suction side of the compressor, the pressure difference on opposite sides of piston 170 will be created. Wave spring 104 is also incorporated in this embodiment to maintain the sealing relationship between floating seal 58 and partition 40 during modulation of non-orbiting scroll member 32. When gap 102 is created the continued compression of the suction gas will be eliminated. When this unloading occurs, discharge valve 54 will move to its closed position thereby preventing the backflow of high pressurized fluid from discharge chamber 42 on the downstream refrigeration system. When compression of the suction gas is to be resumed, solenoid valve 174 will be deactuated (or it will be actuated) to again block fluid flow between tubes 94 and 98 allowing chamber 92 to be pressurized by discharge chamber 42 through passageway 106 and orifice 108. Similar to the embodiment shown in FIGS. 1–3, control module 76 is in communication with sensor array 78 to provide the required information for control module 76 to determine the degree of unloading required and thus the frequency with which solenoid valve 174 is operated in the pulsed width modulation mode.

Figure 5:
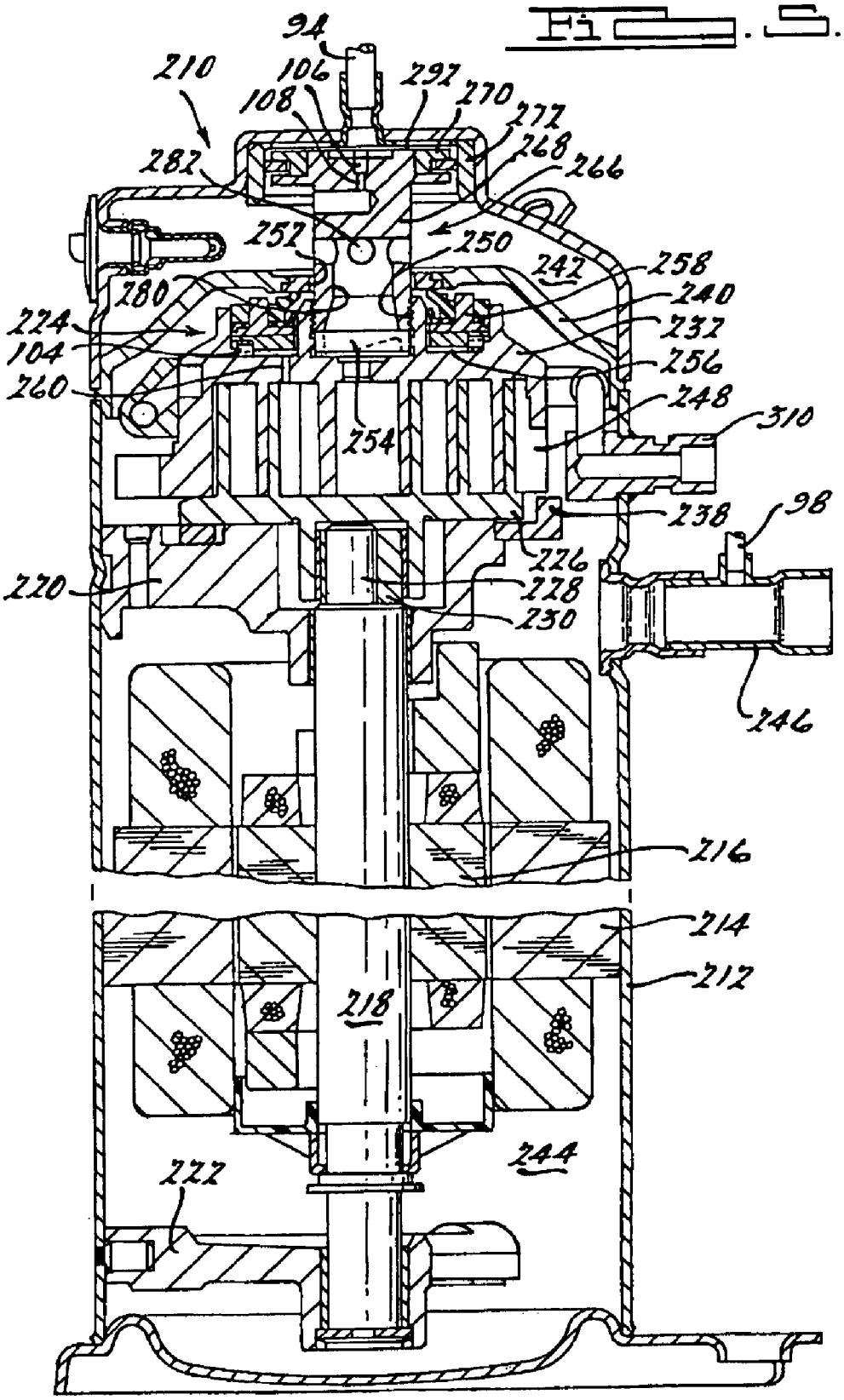
FIG. 5 is a section view of a scroll-type refrigeration compressor in accordance with another embodiment of the present invention.

Referring now to FIG. 5, there is shown a scroll compressor which includes a unique capacity control system in accordance with another embodiment of the present invention and which is designated generally by the reference numeral 210.

Scroll compressor 210 comprises an outer shell 212 within which is disposed a driving motor including a stator 214 and a rotor 216, a crankshaft 218 to which rotor 216 is secured, an upper bearing housing 220 and a lower bearing housing 222 for rotatably supporting crankshaft 218 and a compressor assembly 224.

Compressor assembly 224 includes an orbiting scroll member 226 supported on upper bearing housing 220 and drivingly connected to crankshaft 218 via a crankpin 228 and a drive bushing 230. A non-orbiting scroll member 232 is positioned in meshing engagement with orbiting scroll member 226 and is axially movably secured to upper bearing housing 220 by means of a plurality of bolts (not shown) and associated sleeve members (not shown). An Oldham coupling 238 is provided which cooperates with scroll members 226 and 232 to prevent relative rotation therebetween. A partition plate 240 is provided adjacent the upper end of shell 212 and serves to divide the interior of shell 212 into a discharge chamber 242 at the upper end thereof and a suction chamber 244 at the lower end thereof.

In operation, as orbiting scroll member 226 orbits with respect to scroll member 232, suction gas is drawn into suction chamber 244 of shell 212 via a suction fitting 246. From suction chamber 244, suction gas is sucked into compressor 224 through an inlet 248 provided in non-orbiting scroll member 232. The intermeshing scroll wraps provided on scroll members 226 and 232 define moving pockets of gas which progressively decrease in size as they move radially inwardly as a result of the orbiting motion of scroll member 226 thus compressing the suction gas entering via inlet 248. The compressed gas is then discharged into discharge chamber 242 via a discharge port 250 provided in scroll member 236 and a passage 252 formed in partition 240. A pressure responsive discharge valve 254 is preferably provided seated within discharge port 250.

Non-orbiting scroll member 232 is also provided with an annular recess 256 formed in the upper surface thereof. A floating seal 258 is disposed within recess 256 and is biased by intermediate pressurized gas against partition 240 to seal suction chamber 244 from discharge chamber 242. A passage 260 extends through non-orbiting scroll member 232 to supply the intermediate pressurized gas to recess 256.

A capacity control system 226 is shown in association with compressor 210. Control system 266 includes a discharge fitting 268, a piston 270, a shell fitting 272, solenoid valve 174, control module 76 and sensor array 78 having one or more appropriate sensors. Discharge fitting 268 is threadingly received or otherwise secured within discharge port 250. Discharge fitting 268 defines an internal cavity 280 and a plurality of discharge passages 282. Discharge valve 254 is disposed below fitting 268 and below cavity 280. Thus, pressurized gas overcomes the biasing load of discharge valve 254 to open discharge valve 254 and allowing the pressurized gas to flow into cavity 280, through passages 282 and into discharge chamber 242.

Figure 7:
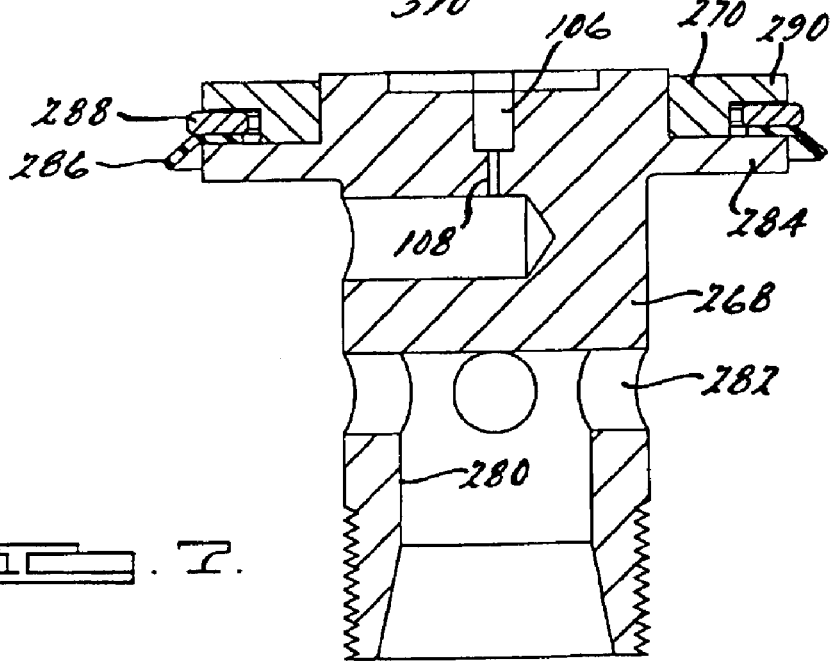
FIG. 7 is an enlarged section view of the piston assembly shown in FIG. 5.
Figure 8:
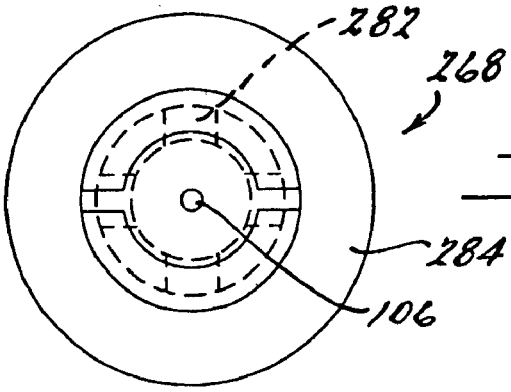
FIG. 8 is a top view of the discharge fitting shown in FIG. 7.

Referring now to FIGS. 5, 7 and 8, the assembly of discharge fitting 268 and piston 270 is shown in greater detail. Discharge fitting 268 defines an annular flange 284. Seated against flange 284 is a lip seal 286 and a floating retainer 288. Piston 270 is press fit or otherwise secured to discharge fitting 268 and piston 270 defines an annular flange 290 which sandwiches seal 286 and retainer 288 between flange 290 and flange 284. Discharge fitting 268 defines passageway 106 and orifice 108 which extends through discharge fitting 268 to fluidically connect discharge chamber 242 with a pressure chamber 292 defined by discharge fitting 268, piston 270, seal 286, retainer 288 and shell 212. Shell fitting 272 is secured within a bore defined by shell 212 and slidingly receives the assembly of discharge fitting 268, piston 270, seal 286 and retainer 288. Pressure chamber 292 is fluidically connected to solenoid 174 by tube 94 and with suction fitting 246 and thus suction chamber 244 through tube 98 in a manner similar to that described above for control system 166. The combination of piston 270, seal 286 and floating retainer 288 provides a self-centering sealing system to provide accurate alignment with the internal bore of shell fitting 272. Seal 286 and floating retainer 288 include sufficient radial compliance such that any misalignment between the internal bore of fitting 272 and the internal bore of discharge port 250 within which discharge fitting 268 is secured is accommodated by seal 286 and floating retainer 288.

In order to bias non-orbiting scroll member 232 into sealing engagement with orbiting scroll member 226 for normal full load operation, solenoid valve 174 is deactivated (or it is activated) by control module 76 to block fluid flow between tube 94 and tube 98. In this position, chamber 292 is in communication with discharge chamber 242 through passageway 106 and orifice 108. The pressurized fluid at discharge pressure within chambers 242 and 292 will act against opposite sides of piston 270 thus allowing for the normal biasing of non-orbiting scroll member 232 towards orbiting scroll member 226 to sealingly engage the axial ends of each scroll member with the respective end plate of the opposite scroll member. The axial sealing of the two scroll members 226 and 232 causes compressor 224 to operate at 100% capacity.

In order to unload compressor 224, solenoid valve 174 will be actuated (or it will be deactuated) by control module 76 to the position shown in FIG. 4. In this position, suction chamber 244 is in direct communication with chamber 292 through suction fitting 246, tube 98, solenoid valve 174 and tube 94. With the discharge pressure pressurized fluid released to suction from chamber 292, the pressure difference on opposite sides of piston 270 will move non-orbiting scroll member 232 upward to separate the axial end of the tips of each scroll member with its respective end plate and the higher pressurized pockets will bleed to the lower pressurized pockets and eventually to suction chamber 244. Orifice 108 is incorporated to control the flow of discharge gas between discharge chamber 242 and chamber 292. Thus, when chamber 292 is connected to the suction side of the compressor, the pressure difference on opposite sides of piston 270 will be created. Wave spring 104 is also incorporated in this embodiment to maintain the sealing relationship between floating seal 258 and partition 240 during modulation of non-orbiting scroll member 232. When gap 102 is created the continued compression of the suction gas will be eliminated. When this unloading occurs, discharge valve 254 will move to its closed position thereby preventing the backflow of high pressurized fluid from discharge chamber 242 on the downstream refrigeration system. When compression of the suction gas is to be resumed, solenoid valve 174 will be deactuated (or it will be actuated) to again block fluid flow between tubes 94 and 98 allowing chamber 292 to be pressurized by discharge chamber 242 through passageway 106 and orifice 108. Similar to the embodiment shown in FIGS. 1–3, control module 76 is in communication with sensor array 78 to provide the required information for control module 76 to determine the degree of unloading required and thus the frequency with which solenoid valve 174 is operated in the pulsed width modulation mode.

Figure 6:
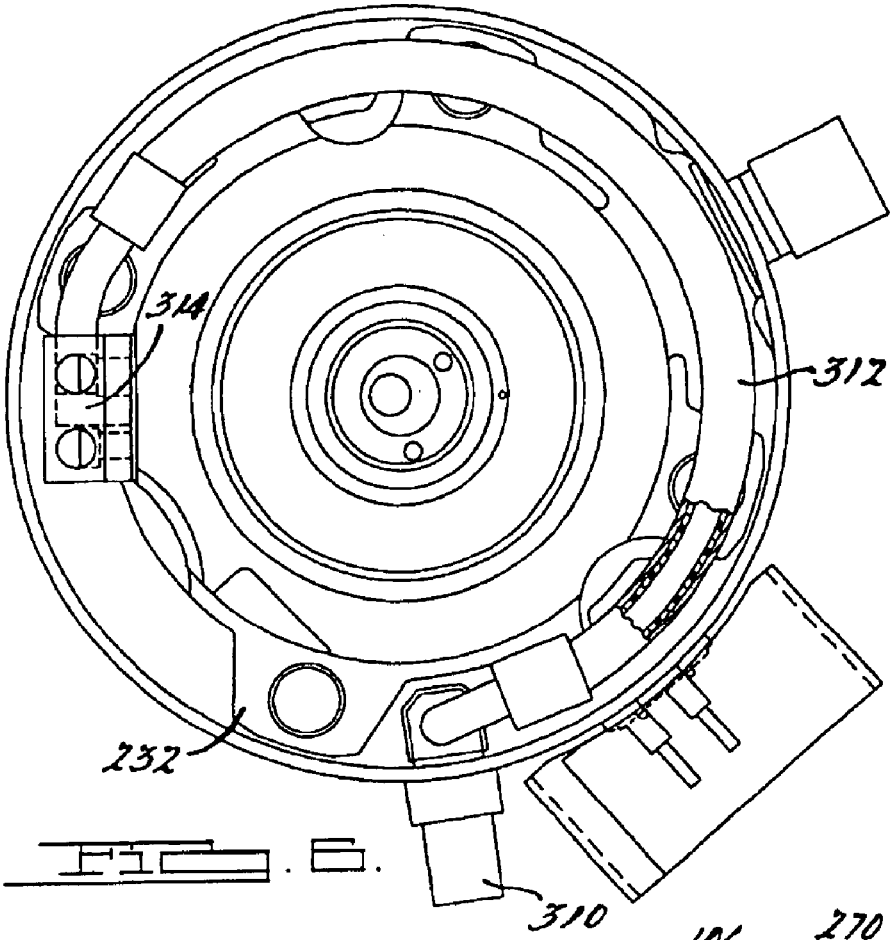
FIG. 6 is a top section view of the compressor shown in FIG. 5.
Figure 10:
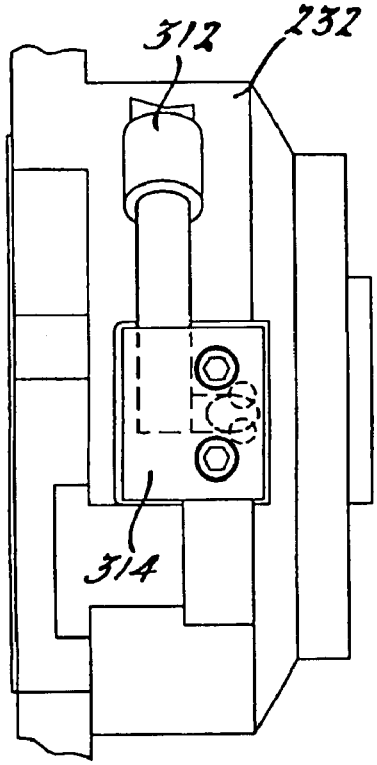
FIG. 10 is a side view of the non-orbiting scroll member shown in FIG. 5.
Figure 11:
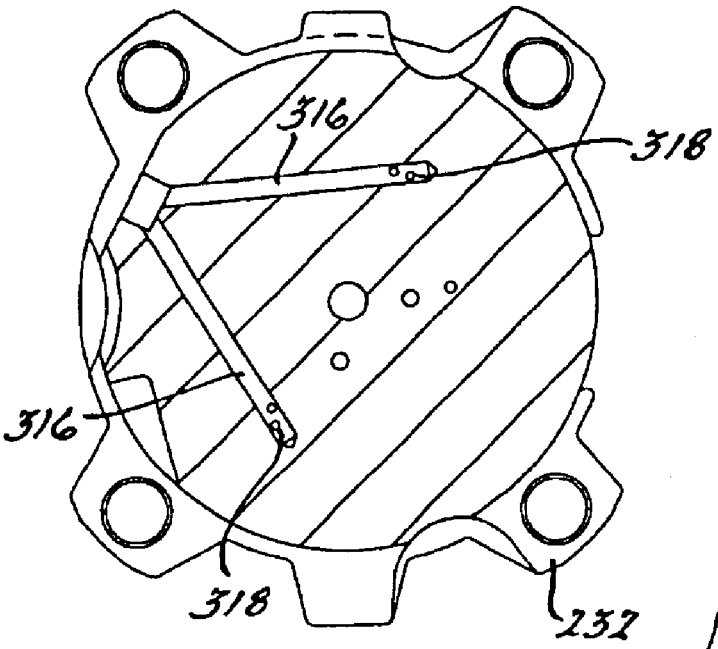
FIG. 11 is a cross sectional top view of the non-orbiting scroll member shown in FIG. 10.

Referring now to FIGS. 6, 10 and 11, the fluid injection system for compressor 210 is shown in greater detail. Compressor 210 includes the capability of having fluid injected into the intermediate pressurized moving chambers at a point intermediate suction chamber 244 and discharge chamber 242. A fluid injection fitting 310 extends through shell 212 and is fluidically connected to an injection tube 312 which is in turn fluidically connected to an injection fitting 314 secured to non-orbiting scroll member 232. Non-orbiting scroll member 232 defines a pair of radial passages 316 each of which extend between injection fitting 314 and a pair of axial passages 318. Axial passages 318 are open to the moving chambers on opposite sides of non-orbiting scroll member 232 of compressor 224 to inject the fluid into these moving chambers as required by a control system as is well known in the art.

Figure 12:
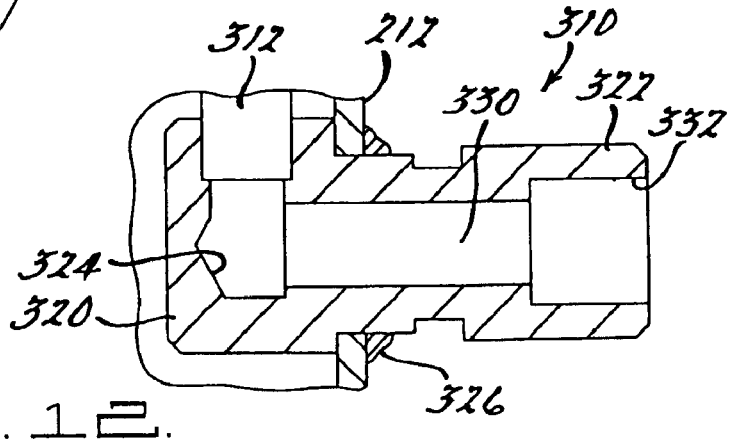
FIG. 12 is an enlarged sectional view of the injection fitting shown in FIG. 5.
Figure 13:
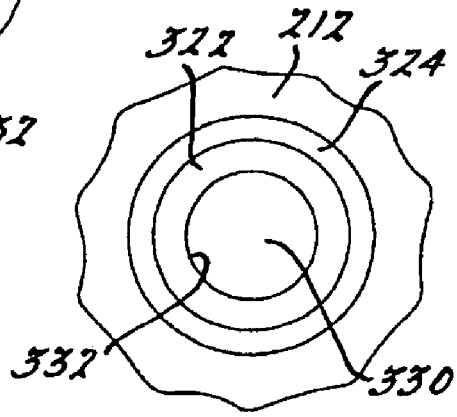
FIG. 13 is an end view of the fitting showing in FIG. 12.

Referring now to FIGS. 12 and 13, fitting 310 is shown in greater detail. Fitting 310 comprises an internal portion 320, and an external portion 322. Internal portion 320 includes an L-shaped passage 324 which sealingly receives injection tube 312 at one end. External portion 322 extends from the outside of shell 212 to the inside of shell 212 where it is unitary or integral with internal portion 320. A welding or brazing attachment 326 secures and seals fitting 310 to shell 212. External portion 322 defines a bore 330 which is an extension of L-shaped passage 324. External portion 322 also defines a cylindrical bore 332 to which the tubing of the refrigeration system is secured.

Figure 14:
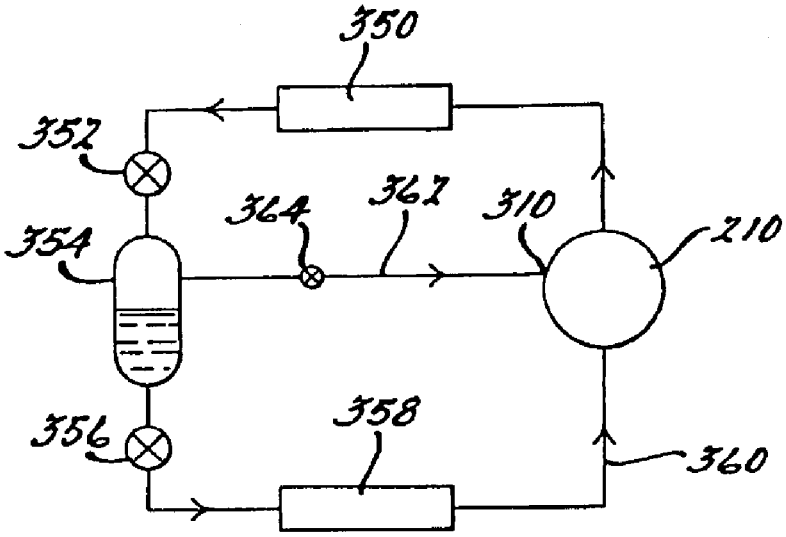
FIG. 14 is a schematic diagram of a refrigerant system utilizing the capacity control system in accordance with the present invention.

FIG. 14 illustrates a vapor injection system which provides the fluid for the fluid injection system of compressor 210. Compressor 210 is shown in a refrigeration system which includes a condenser 350, a first expansion valve or throttle 352, a flash tank or an economizer 354, a second expansion valve or throttle 356, an evaporator 358 and a series of piping 360 interconnecting the components as shown in FIG. 14. Compressor 210 is operated by the motor to compress the refrigerant gas. The compressed gas is then liquified by condenser 350. The liquified refrigerant passes through expansion valve 352 and expands in flash tank 354 where it is separated into gas and liquid. The gaseous refrigerant further passes through piping 362 to be introduced into compressor 210 through fitting 310. On the other hand, the remaining liquid refrigerant further expands in expansion valve 356, is then vaporized in evaporator 358 and is again taken into compressor 210.

Figure 16:
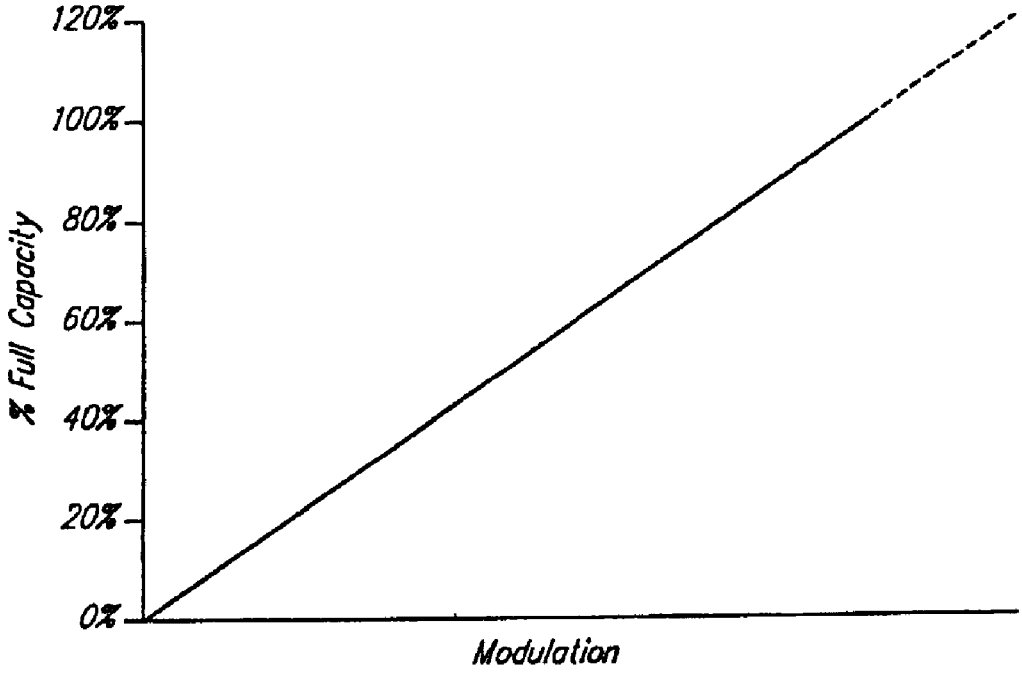
FIG. 16 is a graph showing the capacity of the compressor using the capacity control system in accordance with the present invention.

The incorporation of flash tank 354 and the remainder of the vapor injection system, allows the capacity of the compressor to increase above the fixed capacity of compressor 210. Typically, at standard air conditioning conditions, the capacity of the compressor can be increased by approximately 20% to provide a compressor with 120% of its capacity as shown in the graph in FIG. 16. In order to be able to control the capacity of compressor 210, a solenoid valve 364 is positioned within piping 362. The amount of percent increase in the capacity of compressor 210 can be controlled by operating solenoid valve 364 in a pulse width modulation mode. Solenoid valve 364 when operated in a pulse width modulation mode in combination with capacity control system 266 of compressor 210 allows the capacity of compressor 210 to be positioned anywhere along the line shown in FIG. 16.

Figure 15:
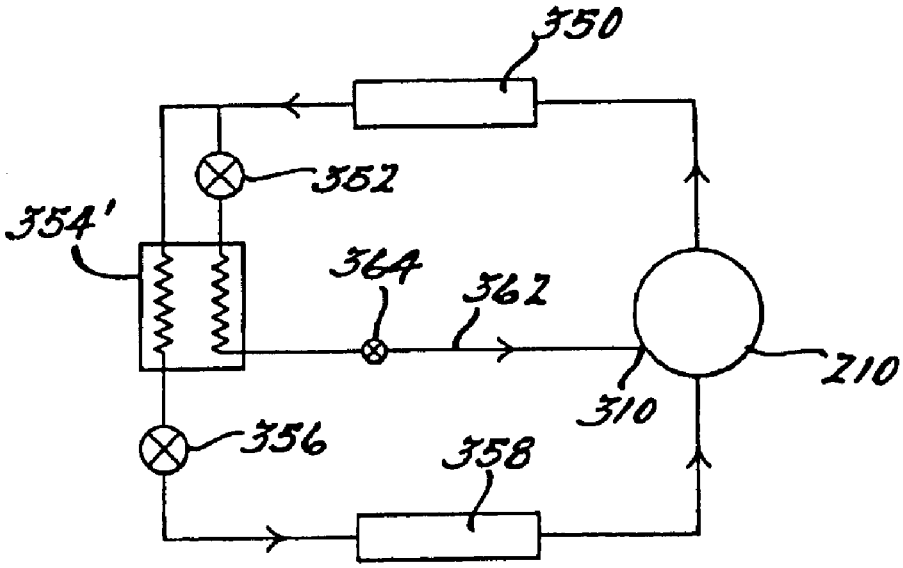
FIG. 15 is a schematic diagram of a refrigerant system in accordance with another embodiment of the present invention.

FIG. 15 illustrates a refrigerant system schematic in accordance with another embodiment of the present invention. The refrigerant system shown in FIG. 15 is the same as the refrigerant system shown in FIG. 14 except that flash tank 354 has been replaced by a heat exchanger 354'. Compressor 210 is operated by the motor to compress the refrigerant gas. The compressed gas is then liquified by condenser 350. The liquified refrigerant is then routed to the liquid side of heat exchanger 354' while a second portion of the liquified refrigerant passes through expansion valve 352 and then is routed to the vapor side of heat exchanger 354' in a gas and liquid state. The portion of refrigerant passing through expansion valve 352 is heated by the portion of refrigerant passing directly through heat exchanger to provide the vapor for injecting into compressor 210. This gaseous refrigerant then passes through piping 362 to be introduced into compressor 210 through fitting 310. On the other hand, the liquid refrigerant passing directly through heat exchanger 354' expands in expansion valve 356 and is then vaporized in evaporator 358 to again be taken into the suction side of compressor 210. Similar to the system shown in FIG. 14, solenoid valve 364 is positioned within piping 362 to allow the capacity of compressor 210 to be positioned anywhere along the line shown in FIG. 16 when used in combination with capacity control system 266.

While the above detailed description describes the preferred embodiment of the present invention, it should be understood that the present invention is susceptible to modification, variation and alteration without deviating from the scope and fair meaning of the subjoined claims.

What is claimed is:

1. A scroll-type machine comprising:

a first scroll member having a first end plate and a first spiral wrap extending therefrom;

a second scroll member having a second end plate and a second spiral wrap extending therefrom, said first and second scroll members being positioned with said first and second spiral wraps interleaved with each other;

a drive member for causing said scroll members to orbit relative to one another, whereby said spiral wraps will create pockets of progressively changing volume between a suction pressure zone and a discharge pressure zone;

said first and second scroll members being movable between a first relationship in which sealing surfaces of said first and second scroll members are in sealing relationship to close off said pockets and a second relationship wherein at least one of said sealing surfaces of said first and second scroll members are spaced apart to define a leakage path between said pockets; and a fluid operated piston *disposed in said discharge pressure zone and* secured to said first scroll, said piston being actuatable to apply a force to said first scroll to move said first scroll between said first relationship where said scroll machine operates at substantially full capacity and said second relationship in which said scroll machine operates at substantially zero capacity.

2. The scroll-type machine according to claim 1, wherein said drive member continues to operate when said first scroll member is in said second relationship.

3. The scroll-type machine according to claim 2, wherein said scroll-type machine includes a discharge flow path for conducting compressed fluid from said scroll-type machine and a check valve located within said flow path to prevent reverse flow of said compressed fluid.

4. The scroll-type machine according to claim 1, wherein said fluid operated piston is operated in a time pulsed manner to modulate the capacity of said scroll-type machine.

5. The scroll-type machine according to claim 1, further comprising a fluid pressure chamber operative to apply said force to said fluid operated piston.

6. The scroll-type machine according to claim 5, wherein said force acts in an axial direction.

7. The scroll-type machine according to claim 6, further comprising a first passage for supplying a pressurized fluid from said scroll-type machine to said pressure chamber.

8. The scroll-type machine according to claim 7, further comprising a valve for controlling flow through said first passage, said valve being operative to vent said pressurized fluid from said pressure chamber to thereby enable said first and second scrolls to move between said first and second relationships.

9. The scroll-type machine according to claim 8, wherein said valve is a solenoid operated valve.

10. The scroll-type machine according to claim 9, wherein said solenoid operated valve is operated in a pulse width modulated mode.

11. The scroll-type machine according to claim 8, further comprising a control module in communication with said valve.

12. The scroll-type machine according to claim 11, further comprising at least one sensor in communication with said control module, said control module being operative to control said valve in response to a signal from said sensor.

13. The scroll-type machine according to claim 7, further comprising a second passage for venting said pressurized fluid from said pressure chamber.

14. The scroll-type machine according to claim 1, wherein said scroll-type machine includes a shell, said fluid operated piston being slidingly received within a fitting secured to said shell.

15. The scroll-type machine according to claim 14, wherein said piston and said fitting define a pressure chamber.

16. The scroll-type machine according to claim 15, wherein said pressure chamber is in communication with a suction chamber defined by said shell.

17. The scroll-type machine according to claim 16, further comprising a valve disposed between said pressure chamber and said suction chamber.

18. The scroll-type machine according to claim 17, wherein said valve is a solenoid valve.

19. The scroll-type machine according to claim 18, wherein said solenoid valve is operated in a pulse width modulated mode.

20. The scroll-type machine according to claim 17, wherein said pressure chamber is in communication with a discharge chamber defined by said shell.

21. The scroll-type machine according to claim 16, wherein said solenoid valve is operated in a pulse width modulated mode.

22. The scroll-type machine according to claim 21, further comprising a valve disposed between said pressure chamber and both said suction chamber and said discharge chamber.

23. The scroll-type machine according to claim 22, further comprising a valve disposed between said pressure chamber and said suction chamber.

24. The scroll-type machine according to claim 23, wherein said valve is a solenoid valve.

25. A scroll-type machine comprising:

a first scroll member having a first end plate and a first spiral wrap extending therefrom;

a second scroll member having a second end plate and a second spiral wrap extending therefrom, said first and second scroll members being positioned with said first and second spiral wraps interleaved with each other;

*a shell housing said first and second scroll members;* a drive member for causing said scroll members to orbit relative to one another whereby said spiral wraps will create pockets of progressively changing volume between a suction pressure zone and a discharge pressure zone;

said first and second scroll members being movable between a first relationship in which sealing surfaces of said first and second scroll members are in sealing relationship to close off said pockets and a second relationship wherein at least one of said sealing surfaces of said first and second scroll members are spaced apart to define a leakage path between said pockets;

a fluid operated piston secured to said first scroll and slidingly received within a bore defined by said shell, said piston being actuatable to apply a force to said first scroll to move said first scroll between said first relationship where said scroll machine operates at substantially full capacity and said second relationship in which said scroll machine operates at substantially zero capacity; and a radially compliant sealing system disposed between said piston and said bore defined by said shell.

26. The scroll-type machine according to claim 25, further comprising an annular fitting disposed between said shell and said piston, said radially complaint sealing system being disposed between said piston and said fitting.

27. The scroll-type machine according to claim 25, wherein said radially complaint sealing system includes a lip seal.

28. The scroll-type machine according to claim 27, wherein said radially complaint sealing system includes a floating retainer.

29. The scroll-type machine according to claim 25, wherein said radially complaint sealing system includes a floating retainer.

30. A scroll-type machine comprising:

a first scroll member having a first end plate and a first spiral wrap extending from said first end plate;

a second scroll member having a second end plate and a second spiral wrap extending from said second end plate, said first and second scroll members being positioned with said first and second spiral wraps interleaved with each other;

a drive member for causing said scroll members to orbit relative to one another whereby said spiral wraps will create pockets of progressively changing volume between a suction pressure zone and a discharge pressure zone;

a mechanism for moving said first and second scroll members between a first relationship where sealing surfaces of said first and second scroll members are in sealing relationship to close off said pockets and a second relationship where at least one of said sealing surfaces of said first and second scroll members are spaced apart to define a leak path between said pockets; and a fluid injection system associated with one of said scroll members for injecting a fluid into at least one of said pockets.

31. The scroll-type machine according to claim 30, wherein said mechanism is operated in a pulse width modulation mode.

32. The scroll-type machine according to claim 31, wherein said fluid being injected into said at least one of said pockets is a vapor.

33. The scroll-type machine according to claim 30, wherein said mechanism includes a solenoid valve.

34. The scroll-type machine according to claim 33, wherein said solenoid valve is operated in a pulse width modulation mode.

35. The scroll-type machine according to claim 30, wherein said mechanism includes a fluid operated piston secured to said first scroll, said piston being activatable to apply a force to said first scroll to move said first scroll between said first and second relationships.

36. The scroll-type machine according to claim 35, wherein said drive member continues to operate when said first scroll member is in said second relationship.

37. The scroll-type machine according to claim 35, wherein said fluid operated piston is operated in a time pulsed manner to modulate the capacity of said scroll-type machine.

38. The scroll-type machine according to claim 37, wherein said fluid injection system includes a solenoid valve for controlling flow of said fluid to said one of said scroll members.

39. The scroll-type machine according to claim 38, wherein said solenoid valve is operated in a pulse width modulation mode.

40. The scroll-type machine according to claim 39, wherein said fluid being injected into one of said pockets is a vapor.

41. The scroll-type machine according to claim 35, wherein said fluid being injected into said at least one of said pockets is a vapor.

42. The scroll-type machine according to claim 30, wherein said fluid injection system includes a solenoid valve for controlling flow of said fluid to said one of said scroll members.

43. The scroll-type machine according to claim 42, wherein said solenoid valve is operated in a pulse width modulation mode.

44. The scroll-type machine according to claim 43, wherein said fluid being injected into one of said pockets is a vapor.

45. A scroll-type machine comprising:

a first scroll member having a first end plate and a first spiral wrap extending from said first end plate;

a second scroll member having a second end plate and a second spiral wrap extending from said second end plate, said first and second scroll members being positioned with said first and second spiral wraps interleaved with each other;

a drive member for causing said scroll members to orbit relative to one another whereby said spiral wraps will create pockets of progressively changing volume between a suction pressure zone and a discharge pressure zone; and a vapor injection system associated with one of said scroll members for injecting a vapor into at least one of said pockets, said vapor injection system including a valve for controlling said vapor being injected into said at least one of said pockets.

46. The scroll-type machine according to claim 45, wherein said valve is a solenoid valve.

47. The scroll-type machine according to claim 46, wherein said solenoid valve is operated in a pulse width modulation mode.

48. The scroll-type machine according to claim 47, wherein said fluid being injected into one of said pockets is a vapor.

*49. The scroll-type machine according to claim 1, wherein said fluid operated piston is responsive to a discharge pressure in said discharge pressure zone.*

*50. A scroll-type machine comprising:*

*a first scroll member having a first end plate and a first spiral wrap extending therefrom;*

*a second scroll member having a second end plate and a second spiral wrap extending therefrom, said first and second scroll members being positioned with said first and second spiral wraps interleaved with each other;*

*a shell housing said first and second scroll members;*

*a drive member for causing said first and second scroll members to orbit relative to one another, whereby said spiral wraps will create pockets of progressively changing volume between a suction pressure zone and a discharge pressure zone;*

*said first and second scroll members being movable between a first relationship in which sealing surfaces of said first and second scroll members are in sealing relationship to close off said pockets and a second relationship wherein at least one of said sealing surfaces of said first and second scroll members are spaced apart to define a leakage path between said pockets;*

*a fluid operated piston secured to said first scroll member, said piston being actuatable to apply a force to said first scroll member to move said first scroll member between said first relationship where said scroll machine operates at substantially full capacity and said second relationship in which said scroll machine operates at substantially zero capacity; and*

*a sealing system operable to provide radial compliance between said first scroll member and said shell.*

*51. The scroll-type machine according to claim 50, further comprising an annular fitting disposed between said shell and said piston, said sealing system being disposed between said piston and said fitting.*

*52. The scroll-type machine according to claim 51, wherein said sealing system includes a seal and a floating retainer.*

*53. The scroll-type machine according to claim 50, wherein said sealing system includes a lip seal.*

*54. The scroll-type machine according to claim 53, wherein said sealing system includes a floating retainer.*

*55. The scroll-type machine according to claim 50, wherein said sealing system includes a floating retainer.*

* * * * *